US008010897B2

(12) United States Patent
Paxson

(10) Patent No.: US 8,010,897 B2
(45) Date of Patent: Aug. 30, 2011

(54) METHOD AND APPARATUS FOR PRESENTING ELECTRONIC LITERARY MACRAMÉS ON HANDHELD COMPUTER SYSTEMS

(76) Inventor: Dana W. Paxson, Rochester, NY (US)

( * ) Notice: Subject to any disclaimer, the term of this patent is extended or adjusted under 35 U.S.C. 154(b) by 870 days.

(21) Appl. No.: 11/828,238

(22) Filed: Jul. 25, 2007

(65) Prior Publication Data
US 2008/0028297 A1    Jan. 31, 2008

Related U.S. Application Data

(60) Provisional application No. 60/833,201, filed on Jul. 25, 2006, provisional application No. 60/909,197, filed on Mar. 30, 2007.

(51) Int. Cl.
G06F 17/00 (2006.01)
(52) U.S. Cl. ........................ 715/273; 715/864
(58) Field of Classification Search .................. 715/255, 715/273, 864
See application file for complete search history.

(56) References Cited

U.S. PATENT DOCUMENTS

| | | | | |
|---|---|---|---|---|
| 5,343,239 A | * | 8/1994 | Lappington et al. | 725/136 |
| 5,745,360 A | | 4/1998 | Leone et al. | |
| 5,887,171 A | | 3/1999 | Tada et al. | |
| 5,901,332 A | | 5/1999 | Gephardt et al. | |
| 6,125,385 A | | 9/2000 | Wies et al. | |
| 6,236,994 B1 | | 5/2001 | Swartz et al. | |
| 6,314,415 B1 | | 11/2001 | Mukherjee | |
| 6,331,867 B1 | * | 12/2001 | Eberhard et al. | 715/864 |
| 6,356,287 B1 | * | 3/2002 | Ruberry et al. | 715/864 |
| 6,453,329 B1 | * | 9/2002 | Dodgen | 715/205 |
| 6,585,776 B1 | | 7/2003 | Bates et al. | |
| 6,684,369 B1 | | 1/2004 | Bernardo et al. | |
| 6,766,362 B1 | | 7/2004 | Miyasaka et al. | |
| 6,966,029 B1 | | 11/2005 | Ahern | |
| 6,968,455 B2 | | 11/2005 | Okayasu et al. | |
| 7,171,618 B2 | * | 1/2007 | Harrington et al. | 715/229 |
| 7,240,209 B2 | | 7/2007 | Carro | |
| 7,290,205 B2 | | 10/2007 | Moncsko et al. | |
| 7,426,687 B1 | | 9/2008 | Schultz et al. | |
| 7,765,473 B2 | * | 7/2010 | Buckley et al. | 715/252 |
| 2001/0039002 A1 | | 11/2001 | Delehanty | |

(Continued)

FOREIGN PATENT DOCUMENTS

JP    2002086964 A    3/2002

OTHER PUBLICATIONS

Marshall et al., Reading-in-the-Small: A Study of Reading on Small Form Factor Devices, ACM 2002, pp. 56-64.*

(Continued)

*Primary Examiner* — Cong-Lac Huynh
(74) *Attorney, Agent, or Firm* — Thomas R. FitzGerald, Esq.; Nicholas J. Gallo, Esq.; Hiscock & Barclay, LLP

(57) ABSTRACT

Handheld computer game-playing systems and similar devices are here adapted for use as electronic readers for literature, specifically supporting complex literary and instructional forms, each a work of literature which is woven and knotted together using many threads of narrative in a nonlinear fashion supported only by programmable electronic systems such as computers. The reader experiences such electronic works on a handheld computing device using conventional Web-browser software supported by said device. The electronic work is adapted to any restrictions or special characteristics of the handheld device to facilitate its proper presentation and use.

19 Claims, 9 Drawing Sheets

U.S. PATENT DOCUMENTS

| | | | |
|---|---|---|---|
| 2002/0000990 A1* | 1/2002 | Schauser | 345/504 |
| 2002/0065964 A1* | 5/2002 | Lemke et al. | 710/48 |
| 2002/0078343 A1 | 6/2002 | Rubin et al. | |
| 2002/0091991 A1* | 7/2002 | Castro | 717/106 |
| 2002/0108109 A1 | 8/2002 | Harris et al. | |
| 2002/0118860 A1 | 8/2002 | Pasqua | |
| 2002/0133464 A1 | 9/2002 | Ress et al. | |
| 2002/0152245 A1 | 10/2002 | McCaskey et al. | |
| 2002/0178185 A1 | 11/2002 | Kuchinsky et al. | |
| 2002/0184189 A1 | 12/2002 | Hay et al. | |
| 2003/0014445 A1* | 1/2003 | Formanek et al. | 707/526 |
| 2003/0078888 A1 | 4/2003 | Lee et al. | |
| 2003/0159566 A1 | 8/2003 | Sater et al. | |
| 2003/0190054 A1 | 10/2003 | Troyansky et al. | |
| 2004/0091132 A1 | 5/2004 | Eguchi et al. | |
| 2004/0128624 A1 | 7/2004 | Arellano et al. | |
| 2004/0230327 A1* | 11/2004 | Opheim et al. | 700/83 |
| 2004/0230457 A1* | 11/2004 | Rosenbloom et al. | 705/2 |
| 2004/0268230 A1 | 12/2004 | Liu et al. | |
| 2005/0019740 A1 | 1/2005 | Cunningham et al. | |
| 2005/0055624 A1 | 3/2005 | Seeman et al. | |
| 2005/0076296 A1* | 4/2005 | Lee et al. | 715/523 |
| 2005/0149851 A1 | 7/2005 | Mittal | |
| 2005/0246635 A1* | 11/2005 | Hirose et al. | 715/530 |
| 2005/0251731 A1 | 11/2005 | Valderas et al. | |
| 2005/0283719 A1* | 12/2005 | Awamoto et al. | 715/513 |
| 2006/0036940 A1* | 2/2006 | Hsiu-Ping et al. | 715/513 |
| 2006/0075241 A1 | 4/2006 | Deguillaume et al. | |
| 2006/0150228 A1 | 7/2006 | Kelly et al. | |
| 2006/0173951 A1* | 8/2006 | Arteaga et al. | 709/203 |
| 2007/0073833 A1 | 3/2007 | Roy et al. | |
| 2007/0087316 A1 | 4/2007 | Arnold et al. | |
| 2007/0101263 A1* | 5/2007 | Bedingfield, Sr. | 715/526 |
| 2007/0118801 A1* | 5/2007 | Harshbarger et al. | 715/730 |
| 2007/0136674 A2 | 6/2007 | Schumacher et al. | |
| 2007/0150829 A1* | 6/2007 | Eschbach et al. | 715/781 |
| 2007/0162878 A1* | 7/2007 | Lee | 715/864 |
| 2007/0204211 A1 | 8/2007 | Paxson | |
| 2007/0299914 A1* | 12/2007 | Jones et al. | 709/205 |
| 2008/0025559 A1 | 1/2008 | Paxson | |
| 2008/0027822 A1 | 1/2008 | Paxson | |
| 2008/0037879 A1 | 2/2008 | Paxson | |
| 2008/0141182 A1* | 6/2008 | Barsness et al. | 715/864 |
| 2008/0189648 A1 | 8/2008 | Anglin et al. | |
| 2008/0193101 A1 | 8/2008 | Agnihotri et al. | |
| 2008/0216022 A1 | 9/2008 | Lorch et al. | |
| 2008/0301698 A1 | 12/2008 | Badaloo et al. | |
| 2009/0150612 A1 | 6/2009 | Cooper et al. | |

OTHER PUBLICATIONS

Schmalstieg et al., Experiences with Handheld Augmented Reality, Google 2007, pp. 1-13.*

Cavanaugh, EBooks and Accommodations. Is it the Future of Print Accommodation?, Google 2002, pp. 56-61.*

Fies et al., Classroom Response Systems: A Review of the Literature, Google Mar. 2006, pp. 101-109.*

Sittig et al., Techniques for Identifying the Applicabilty of New Information Management Technologies in the Clinical Setting: An Example Focusing on Handheld Computers: Googe 2000, pp. 804-808.*

York et al., Humain -computer Interaction Issues for Mobile Computing in a Variable Work Context, Google 2004, pp. 771-797.*

Patten et al., Designing Collaborative, Constructionist and Contextual Applications for Handheld Devices, Google 2006, pp. 294-308.*

International Search Report and Written Opinion in corresponding PCT application (PCT/US07/62801) dated Jun. 3, 2008 (total 13 pages).

Andres, C., "Authoring Software Offers Multiple Choices," MacWeek, vol. 5, No. 22, p. 30, Jun. 11, 1991.

Baron, D., "The Madness of Roland; an Ambitious, and Difficult, Interactive Novel," Digital Media, vol. 2, No. 10-11, p. 17, Mar. 29, 1993.

Holzberg, C.S., "Off with Their Heads!" CD-ROM World, vol. 9, No. 7, pp. 78-79, Jul./Aug. 1994.

Anon., "InterGO: Industry's First Enriched Internet Software Is Now Available Worldwide," Business Wire, P. 01031195, Jan. 3, 1996.

Anon., "Database Confidential," Data Based Advisor, vol. 14, No. 10, p. 98, Oct. 1996.

Anon., "Special TMC™ Labs Review: Skills-Based Routing: Matchmaking and the Call Center, Part II," Call Center Solutions, vol. 18, No. 11, pp. 94-100, May 2000.

Ditlea, S., "The Real E-Books," Technology Review, vol. 103, No. 4, pp. 70-78, Jul./Aug. 2000.

Reid, C., "E-Lit Support Group Formed," Publishers Weekly, vol. 247, No. 32, p. 57, Aug. 7, 2000.

Anon., "Tales That Let You," Statesman (India), Nov. 14, 2004.

Dale et al., Integrating Natural Language Generation and Hypertext to Produce Dynamic Documents, Google 1998, pp. 109-135.

Weiss et al., HyPursuit: A Hierarchical Network Search Engine that Exploits Content-Link Hypertext Clustering, ACM 1996, pp. 180-193.

Barrett, Create Your Own Electronic Portfolio, Google 2000, pp. 14-12.

Hilts, P., "Dial-A-Book: Very Direct Marketing," Publishers Weekly, vol. 242, No. 6, p. 29, Feb. 6, 1995.

Ojala, M., "The European Online Scene," Searcher, vol. 4, No. 3, p. 22, Mar. 1996.

Pearson, S.B., "Heading Into Uncharted Territory? (Updating Marine Navigation Charts)," Cruising World, vol. 25, No. 9, p. 106, Sep. 1999.

Anon., "New Stephen King eBook Exclusive to Be Available Through netLibrary and peanutpress.com," Business Wire, p. 0049, Mar. 8, 2000.

Guinn, J., "So You Want to Write a Book? Here Are Tips to Get It Published," Miami Herald, Broward edition, Living section, p. 5E, Aug. 16, 2001.

Anon., "The Future of the Printed Word Seems Smudgy," Financial Express, Nov. 12, 2005.

Ojala, M., "Reviewing Google Book Search," Online, vol. 30, No. 2, p. 12, Mar.-Apr. 2006.

* cited by examiner

METHOD AND APPARATUS FOR PRESENTING ELECTRONIC LITERARY MACRAMÉS ON HANDHELD COMPUTER SYSTEMS

REFERENCE TO RELATED APPLICATIONS

This application claims the benefit of U.S. Provisional Application No. 60/833,201, filed Jul. 25, 2006, entitled "Multiple Improvements in Method and Apparatus for Creating Literary Macrames," U.S. Provisional Application No. 60/909,197, filed Mar. 30, 2007, entitled "Game Scene Replay Director: A Tool for Filmmaking Storytellers," and U.S. Nonprovisional application Ser. No. 11/361,439, filed Feb. 24, 2006, entitled "Apparatus and Method for Creating Literary Macramé's," all of which are hereby incorporated by reference. This application also claims the benefit of PCT Application No. PCT/US2007/062801, filed Feb. 26, 2007, entitled "Apparatus and Method for Creating Literary Macrames," which is hereby incorporated by reference. Reference is also made to the following related applications: U.S. Nonprovisional application Ser. No. 11/782,976, filed Jul. 25, 2007 (now U.S. Pat. No. 7,555,138, issued Jun. 30, 2009), entitled "Method and Apparatus for Digital Watermarking for Electronic Literary Macramé," U.S. Nonprovisional application Ser. No. 11/828,083, filed Jul. 25, 2007, entitled "Method and Apparatus for Electronic Literary Macramé Component Referencing," and U.S. Nonprovisional application Ser. No. 11/828,010, filed Jul. 25, 2007, entitled "Method and Apparatus for Electronic Literary Macramé Business Development," all of which are hereby incorporated by reference.

AREA OF INVENTION

This disclosure relates to the presentation of texts readable on handheld computers, and more specifically to the presentation on handheld computers of interconnected narratives and references readable using browser programs such as those adapted for use on the World Wide Web.

BACKGROUND OF INVENTION

To illustrate and provide background for the present method and apparatus, the patent application titled "Apparatus and Method for Creating Literary Macramés", U.S. patent application Ser. No. 11/361,439, by the present inventor, is incorporated herein by reference. A literary macramé, also called here an 'ELM', or electronic literary macramé, is a form of text offering readers advantages over other forms of literature in referencing and tracing connections.

To provide further background and support for the present method and apparatus, the patent application titled "The Knowledge Transfer Tool: An Apparatus And Method For Knowledge Transfer", International Application No. PCT/US2007/062801, also by the present inventor, is also incorporated herein by reference. The Knowledge Transfer Tool, also called here a 'KTT', combines ELM characteristics and capabilities with rule-based expert system and programmed-instruction components to allow authors to produce immersive learning programs in literary and textbook forms on electronic media.

To provide context for ongoing developments relating to the present method and apparatus, the patent applications titled "Method And Apparatus For Electronic Literary Macramé Component Referencing", "Method And Apparatus For Electronic Literary Macramé Business Development", and "Method And Apparatus For Digital Watermarking For The Electronic Literary Macramé", also by the present inventor, are additionally incorporated herein by reference.

Handheld game computer systems have developed into sophisticated tools for the presentation of images, animation, graphics, movies, and in general multimedia streams of such presented materials.

Electronic texts have emerged as superior replacements for printed works in certain areas of publication, particularly those areas in which links within the texts lead to references, alternative narratives, or supporting materials of other kinds such as audio or image streams. But these advantages gain little recognition in the realm of mass-market literature such as fiction and nonfiction.

The hardware devices used so far to present electronic literature are expensive, mutually incompatible, and complicated to use. The forms in which the literature is presented mimic fairly closely the forms used in the printed media, in an effort to preserve the immersive reading experience. The advantages presented by the availability of textual linkages in the electronic form are rarely exploited. Such exploitation would yield great and diverse benefits for authors, publishers, and readers across the board.

Handheld computing devices combine the convenience of portability with many of the broad range of features available to a user of a laptop or desktop personal computer. Among the best handheld computing devices, from a display and operability standpoint, are the systems used for playing graphical computer games, e.g., the Sony PlayStation Portable and similar systems. Systems used as personal digital assistants (PDAs), e.g., the Palm T/X and similar systems have similar characteristics. Systems used primarily as wireless phones, e.g., the Nokia, Motorola, Samsung and other phones, have smaller displays in general, but some offer displays large enough to present documents to a viewer clearly enough for easy reading. Systems that combine functions such as the Blackberry from RIM have large displays, keyboards, and wireless phone capability. Systems of all these types have high-resolution graphics, wireless Internet access, Web browsers, and large-scale file storage, all fitting into a package that can be carried in a shirt pocket.

Readers, authors, and publishers would benefit greatly from storage and presentation of complex forms of literature using such devices. Compact, lightweight, handheld reading systems would be ideal vehicles for carrying and presenting academic, scholastic, and other structured textual and multimedia materials for readers. The availability of wireless Internet access, browsers, and file storage offer some opportunities to exploit these devices for use in presenting electronic literature and texts to readers. To date these opportunities have, for the most part, remained poorly explored. Presentations of conventional literature have been limited in selection, unimaginative in their use of the powerful features of popular handheld electronic devices, and insensitive to the needs for concentration required by most readers.

SUMMARY

The method and apparatus enhance the use of handheld computer systems as electronic readers for structured electronic documents, specifically supporting works of literature and instruction that use diverse and networked threads of narrative while offering seamless access to multiple reference source components. The method and apparatus adapt presentation of said works to the restrictions, distinctions, and advanced capabilities of a wide range of said handheld devices. The method and apparatus present said works using conventional Web-browser software as supported by said device.

DETAILED DESCRIPTION OF THE INVENTION

Figure 1:
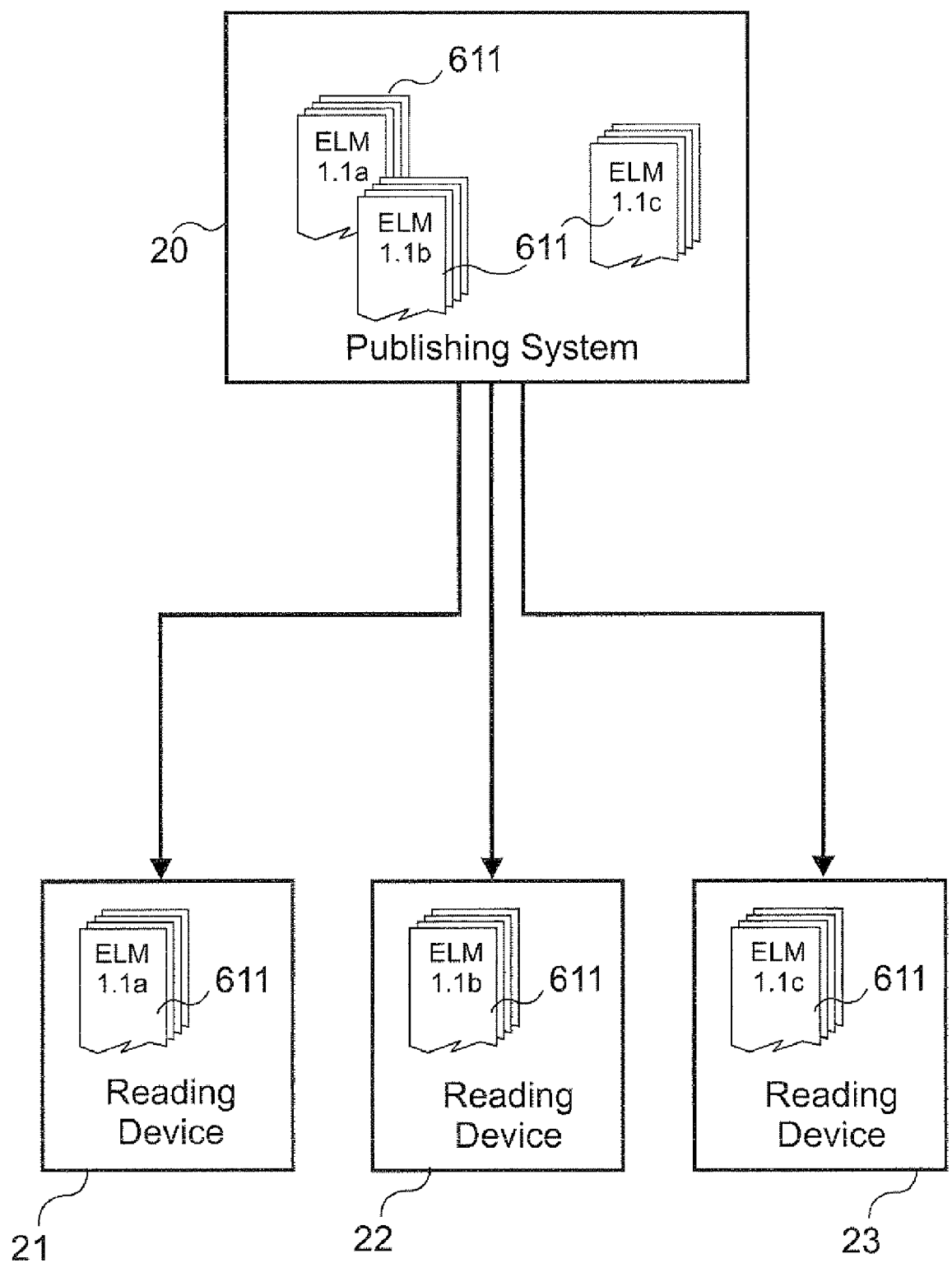
FIG. 1 shows an overview of the components and processing of the present method and apparatus.

Referring to FIG. 1, a plurality of computer systems 20, 21, 22, 23 is shown. Each computer system 21, 22, 23 comprises a handheld computer system used as a device for reading electronic documents 611. Each computer system 20 comprises a publishing computer system used for providing electronic documents 611 to client computer systems 21, 22, 23.

Figure 2:
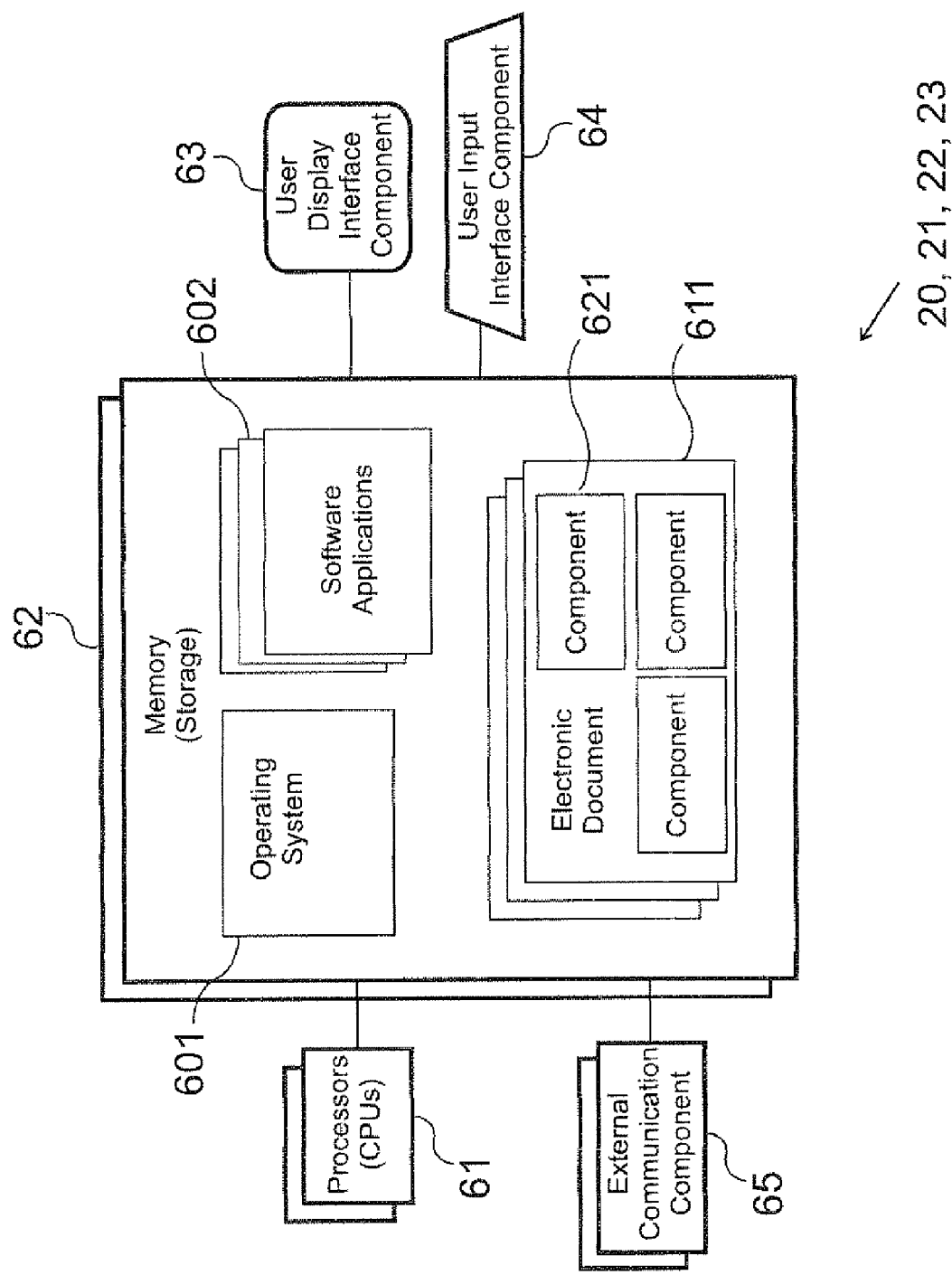
FIG. 2 shows an overview of the computer structures of the present apparatus.

Referring to FIG. 2, a plurality of publishing computer systems 20 and a plurality of handheld electronic devices 21, 22, 23 is shown. Each of the publishing computer systems 20 is made up of one or more processors (CPUs) 61, a user display interface component 63, one or more user input interface components 64, one or more memory components 62, and one or more external communications components 65. Each of the handheld electronic devices 21, 22, 23 is likewise made up of one or more processors (CPUs) 61, a user display interface component 63, one or more user input interface components 64, one or more memory components 62, and one or more external communications components 65.

In each publishing computer system 20 is a configuration database component containing classes of handheld device configuration characteristics. The database component contains a window map database component of each said class of handheld device configuration characteristics showing how different types of ELM/KTT components map to different windows in each device type. Each publishing computer system 20 also holds electronic literary or instructional input files for said electronic literary or instructional work, presentation component files for said electronic literary or instructional work, and a plurality of publishing software applications. Each handheld electronic device 21, 22, 23 holds a plurality of presentation software applications for presenting the electronic literary or instructional input files for said electronic literary or instructional work to a reader.

The publishing software applications include programs for storing and retrieving each class of handheld device configuration characteristics to and from the configuration database component, programs for compiling and storing configuration characteristics for each class of handheld electronic device to be used for presentation of an ELM/KTT, and programs for compiling ELM/KTT input files into one or more sets of presentation component files. Each set of presentation component files is suitable for storage, retrieval, and presentation on a different class of handheld electronic devices.

The publishing software applications also include programs for selecting a specific class of handheld electronic device to be used, retrieving a set of presentation component files based on the selected class, sending the retrieved set to the handheld device, and installing the retrieved set on the handheld device for presentation.

The programs for compiling and storing configuration characteristics for each class of presentation handheld electronic device include programs to determine, and store in the configuration database, such configuration characteristics as usable memory capacity, usable file storage capacity, usable number of browser windows, and presentation features specific to said class of device. In one specific instance, the present apparatus and method use a three-window display design, but different handheld devices offer different numbers of windows for display. Sometimes only one or two windows are provided within a handheld device. In addition, the present method and apparatus are adaptable for the use of more than three windows Consequently, the programs for compiling and storing configuration characteristics for each class of handheld electronic device include programs for classifying units of a complex electronic literary or instructional work into display classes for display in a browser window assigned to each said display class, assigning one said browser window to each said display class, creating a window map condensing a larger plurality of display classes into a smaller plurality of display classes for each said class of handheld device, and including said window map in said set of presentation features for each said class of handheld device.

The programs for compiling the ELM/KTT for presentation include programs for retrieving device configuration characteristics from said configuration database component for each class of handheld electronic device to be targeted, processing electronic literary or instructional input files into presentation component files, creating presentation scripts of the electronic literary or instructional work, and combining said presentation component files and presentation scripts. The output result is a complete, consistent electronic literary or instructional work (ELM/KTT) for use on each class of handheld electronic device.

The programs for installation of the ELM/KTT comprise a server software application operating on the publishing computer systems for sending the set of presentation component files in a specific class to handheld electronic devices of said class, and a client software application operating on each of the handheld electronic devices for receiving and storing said set of presentation component files for use by a reader using a browser program as the presentation software application. The browser program comprises a conventional hypertext display program for processing hypertext markups such as HTML or XHTML, and a conventional script interpretation program such as JavaScript for processing active elements in a display script used by the hypertext display program.

Different handheld computer systems 21, 22, 23 intended for personal use require their users to understand and apply different procedures of usage. Furthermore, each such computer system 21, 22, 23 requires that providers of information to its users learn the characteristics of the system in order to ease the user's access to that information. Complex literary or instructional works present challenges to both readers and providers when offered over a wide range of handheld computing devices 21, 22, 23. The present method and apparatus simplify those challenges.

For the most part, works of literature are not enhanced to take full advantage of such forms of presentation as are described in the referenced patent applications. One such form is here termed an "electronic literary macramé" (ELM): a work of literature which is woven and knotted together using many threads of narrative in a nonlinear fashion. A closely-related form is the "knowledge transfer tool" (KTT): a work of instruction with multiple, programmable threads of lesson and unit presentation. Both ELM and KTT also supply easily-accessible and non-disruptive access to multiple sources of reference and other supporting information.

The present method and apparatus address the presentation of complex literary and instructional works that characteristically engage readers immersively in their narratives, in such a way that the reading experience keeps the work itself transparent and invisible to the reader to the greatest extent possible. To present such works on different types of handheld devices such as wireless phones, PDAs, game systems, and systems combining features of two or more of these types, the method and apparatus maintain a set of definitions of the configuration characteristics of said devices, and applies said set of definitions both during the creation of the ELM/KTT, during the distribution and installation of the ELM/KTT output on the reader's handheld device, and during the presentation of the ELM/KTT output to the reader.

Different handheld computing devices have different hardware and software characteristics. The differences among different types of device classify them into different configuration classes. For example, some such devices provide for multiple windows or panes in their browser displays, while others do not. Similarly, devices serving different types of users provide different capabilities. Some handheld computing devices used almost exclusively for playing graphical computer games with multimedia suppport are equipped with wireless Internet access, a Web browser, a pointing device, and storage space for files. Currently nearly all of these resources are provided for, and used for, the accessing and playing of games. An example of this first class of devices is the Sony Playstation Portable, or PSP. The method and apparatus use as input an electronic literary macramé (ELM), which it modifies to use the characteristics of the handheld device's resources, and stores the ELM on the handheld device for retrieval and presentation using the device's browser.

A second class of handheld computing devices, often termed "personal digital assistants" (PDAs), are used for storage and processing of organized texts, such as calendars, address books, phone books, 'to-do' lists, memos, and electronic mail. Like those in the first class of devices, members of this second class of devices are often equipped with wireless Internet access, a Web browser, a pointing device, and storage space for files. This second class of devices is used to store conventional textual works, but the works stored therein are predominantly ordinary text, and behave in the same linear fashion as does ordinary text in a printed work. An example of this second class of devices is the PalmPilot equipped with wireless access.

A third class of handheld computing device is the wireless phone, most of which are now also equipped with wireless Internet access, a Web browser, a pointing device, and storage space for files. These devices have many of the same functions as the PDAs.

A fourth class of handheld computing device combines the wireless Internet access, Web browser, pointing device, and file storage with functions from any of the three classes above and others as well, such as calculators or electronic book readers.

The method and apparatus present output on these and similar device classes to present a user with any ELM/KTT in a form suited to the small screen, browser limitations, pointing and selection methods, and other restrictions and capabilities of the device being used. The method and apparatus take two elements as input: an ELM/KTT's inputs as provided by an author, and a list of characteristics of each target handheld device. The method and apparatus replace certain Javascript and HTML components of the ELM/KTT with others suited specifically for the target device, and produce a file folder containing the resulting customized ELM/KTT output. Using conventional means such as memory sticks, flash memory chips, USB file transfer, or wireless links, the user may then load the customized ELM/KTT onto the device for reading with the device's Web browser.

Figure 3:
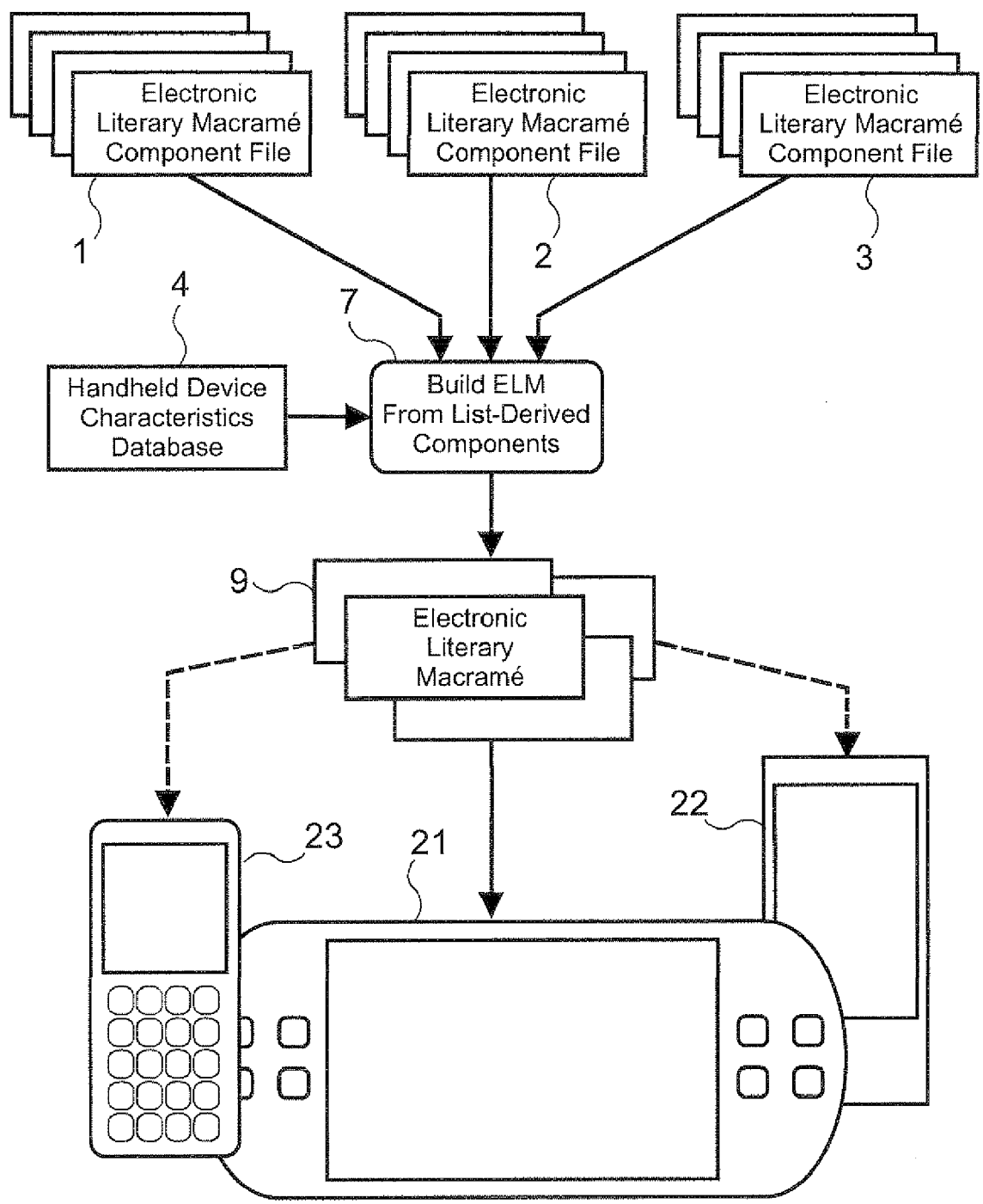
FIG. 3 shows an overview of the components and processing of the present apparatus.

An exemplifying implementation of the present method and apparatus is hereinafter described, to serve as the model for other embodiments listed below. See FIG. 3. The method retrieves or elicits from a provider a list of characteristics 4 for a target device, here the Sony PSP 21, and determines that memory restrictions and the PSP's limit of three concurrently-open browser windows requires that the ELM/KTT be partitioned and stored accordingly. The method then chooses a small-page implementation of the ELM/KTT, in which each page to be displayed is divided into multiple components 1 for access, wherein each component is sized and formatted for convenient reading on the Sony PSP's screen. The method further chooses a tailored series of Web pages 2, together with their supporting Javascript components, that presents the ELM/KTT to the reader within the device's three-Web-page limitation and adheres to any restrictions on the PSP browser's use of JavaScript or stylesheets.

Finally, the method combines (7) the small-page ELM/KTT with the tailored Web pages and supporting Javascript 3 to produce a Sony PSP ELM/KTT 9 in a file folder on the system used for preparation. The provider then transfers the ELM/KTT 9 to the Sony PSP 21 using a flash memory chip, the USB port, or the wireless connection, activates the PSP's browser, and enters the name of the initial file of the ELM/KTT for display. A similar process furnishes the ELM/KTT on other handheld computing device classes 22, 23.

Figure 4:
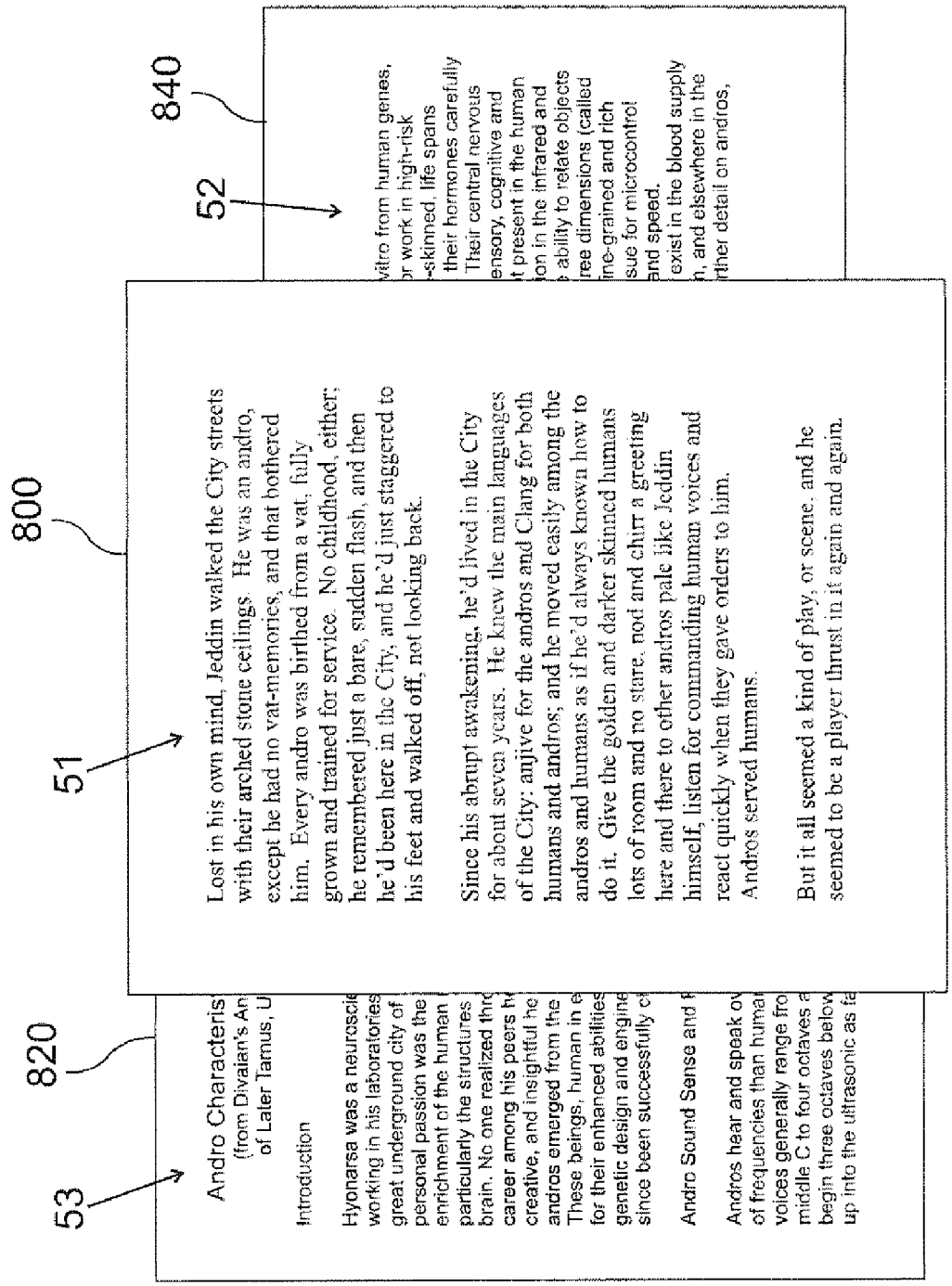
FIG. 4 shows the three-window display of the present apparatus.

See FIG. 4. The basic embodiment of the ELM/KTT includes a three-window display that shows concurrently the main text window 800 overlaying two flanking windows 820, 840, one (840) for a glossary or index, and one (820) for reference or encyclopedia content. Some handheld devices cannot display more than one such window, principally due to the small size of the display, but also possibly due to the need to furnish more-complex software to handle the reader's needs for a small display.

Figure 5:
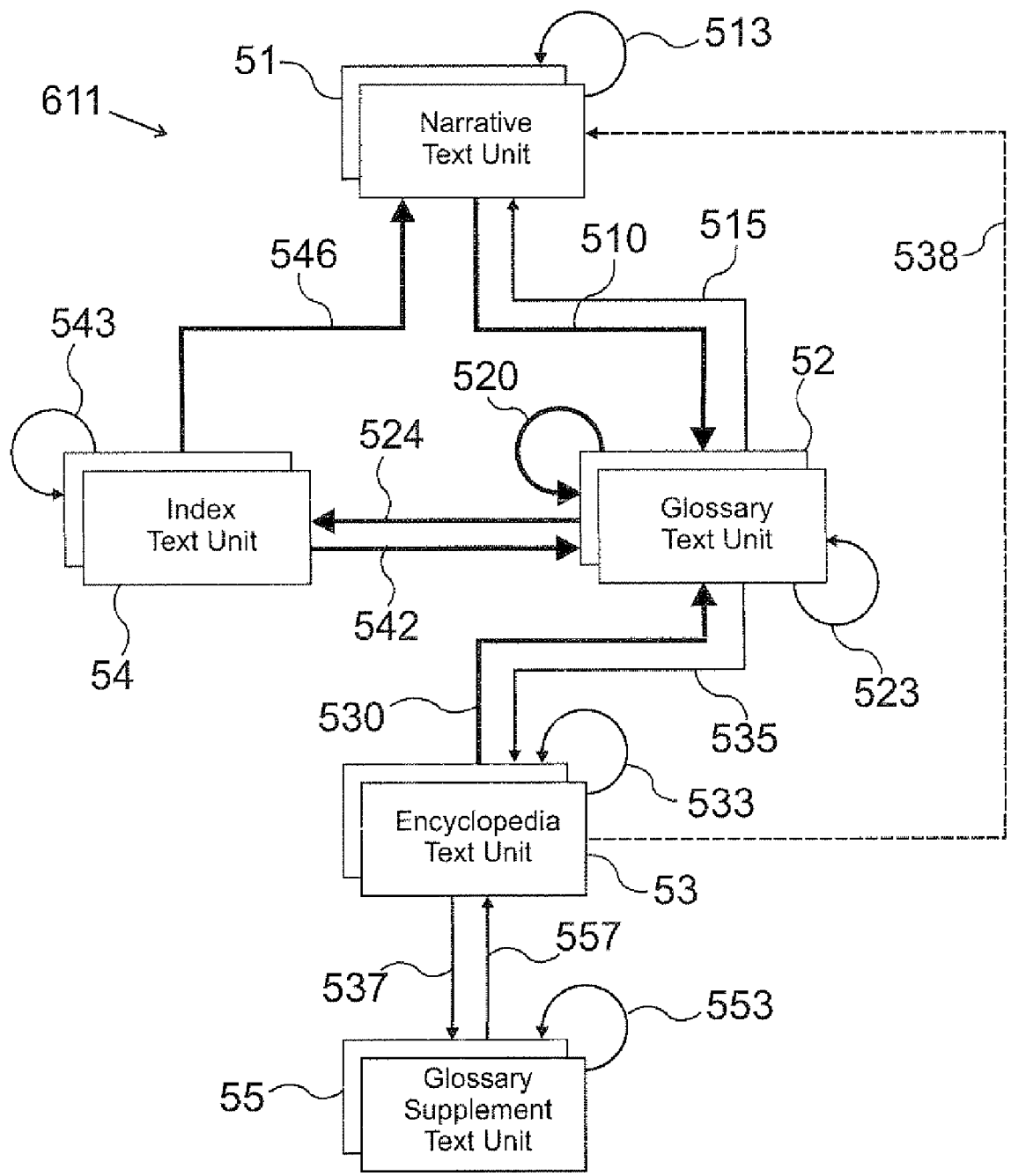
FIG. 5 shows an overview of the linking relationships among the components of the output of the present method and apparatus.

The present method and apparatus address the one-window display limitation by providing an alternative processing pathway for compiling the ELM/KTT for such devices. See FIG. 5 and FIG. 4. In an ELM/KTT 611 used in a system capable of displaying three pages, narrative text units 51 are displayed in the main text window 800, glossary text units 52 and index text units 54 are displayed in the right-hand flanking window 840, and reference or encyclopedia text units 53 and glossary supplement text units 55 are displayed in the left-hand flanking window 820. But in an ELM/KTT 611 used in a system limited to a one-page browser display, all text units are displayed in the single main window 800 as soon as the reader selects a link, and the reader simply uses the browser Back button control to navigate between the units displayed on that same window. For example, looking up a glossary unit 52 by selecting a term in main text page 800 results in display of glossary unit 52 in main text window 800, overlaying any narrative text unit 51 in main text window 800. To return to the overlaid narrative text unit 51, the user selects the browser 'back' button. Although the advantages of quick glances between concurrently-displayed pages are diminished, the advantage of simplicity of switching pages remains.

A similar generalized mapping process in a configuration-enhanced embodiment of the invention allows for any larger number of windows to be mapped to a smaller number of windows, so that if a handheld device can display two windows concurrently, the present method and apparatus allows for two of the three windows of the ELM/KTT to be mapped to the same window for display on the handheld device. This generalized mapping process provides added flexibility in cases where the ELM/KTT may optimally use more than three windows for its basic mode of operation.

Figure 6:
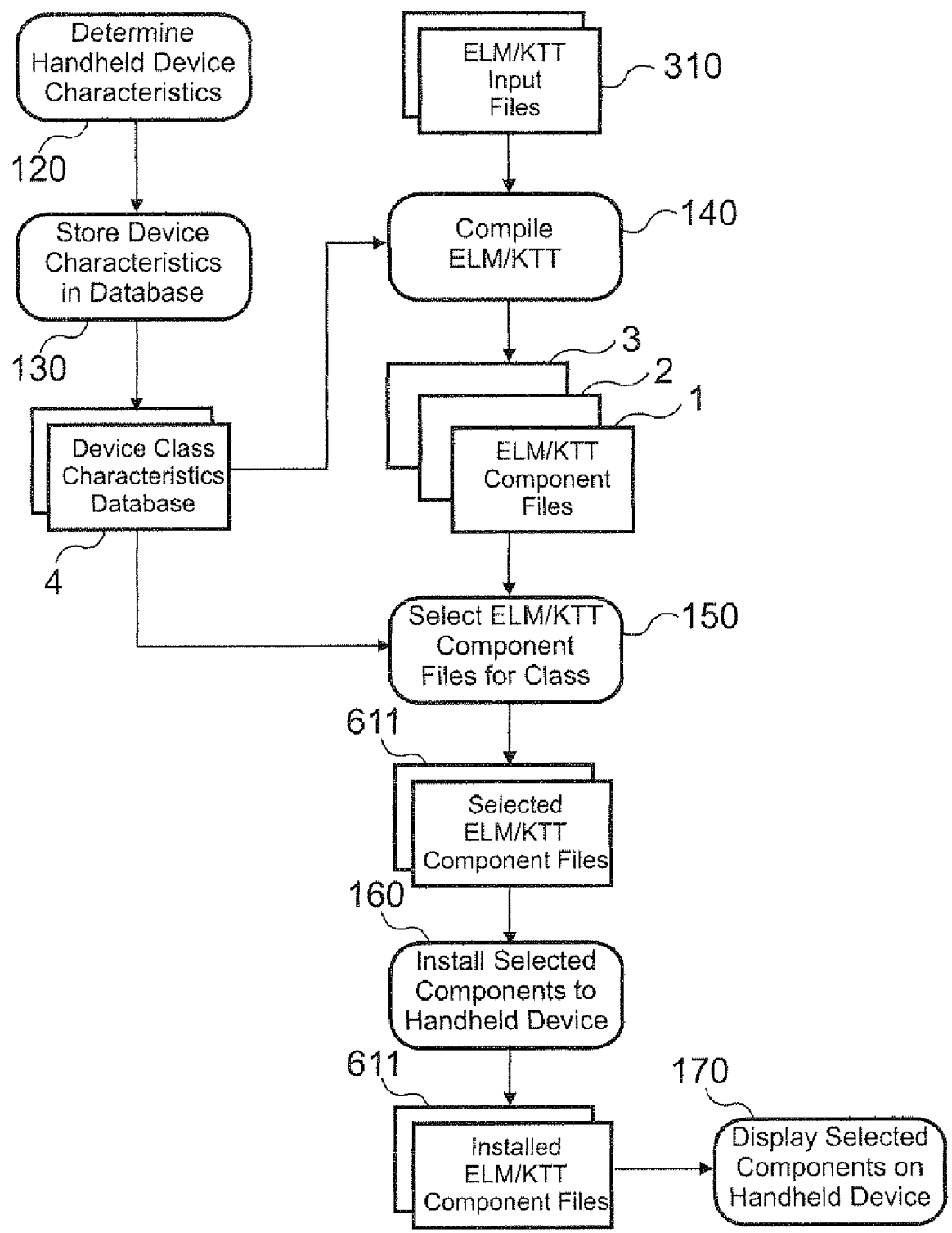
FIG. 6 shows the processing overview of the present method.

See FIG. 6 for an overview of the present method. For presenting a complex electronic literary or instructional work such as an ELM/KTT on a specific class of handheld electronic device, the present method compiles (120, 130) a database of device configuration characteristics 4 for each class of said handheld electronic device to be used for presentation of the ELM/KTT, compiles (140) the ELM/KTT input 310 into one or more sets of components 1, 2, 3 suitable for storage, retrieval, and presentation on each of said classes of handheld electronic devices, selects (150) one set 611 of said sets of components, installs (160) said set of selected components 611 on said handheld electronic device as an ELM/KTT, and displays (170) components of the ELM/KTT on said handheld electronic device as selected by the user of the device.

Figure 7:
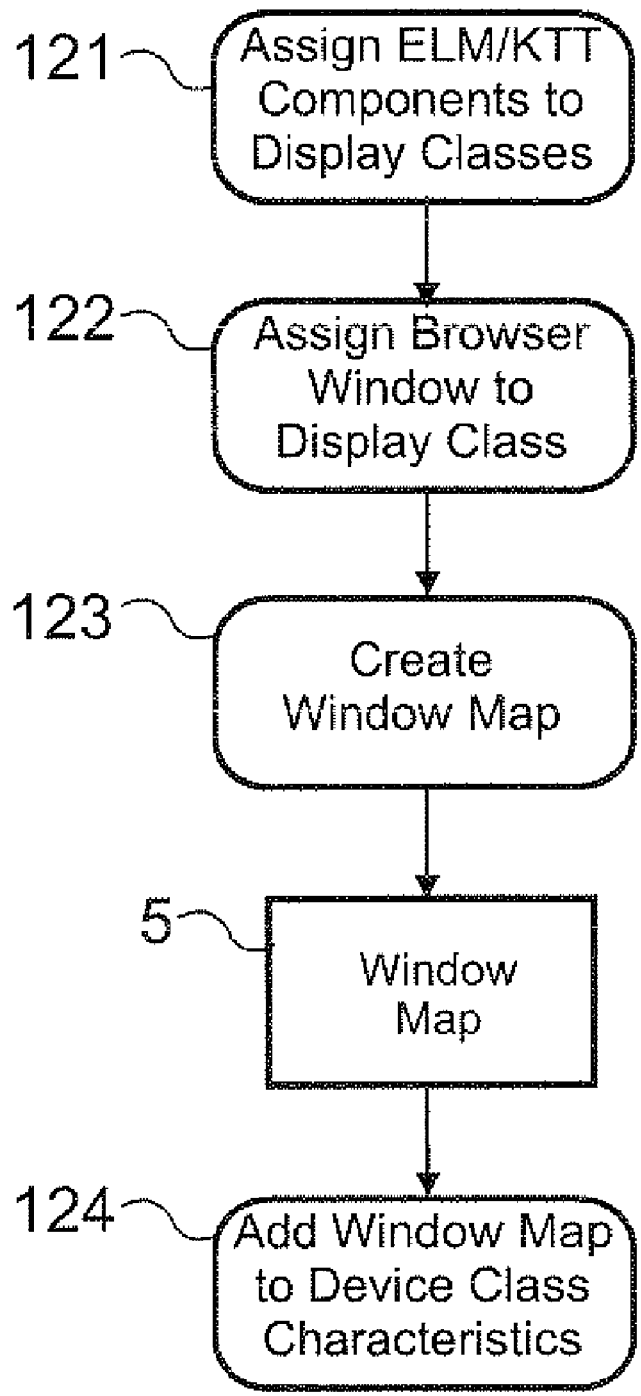
FIG. 7 shows the construction of the window map for of the present method.

Compiling the database of device configuration characteristics 4 requires determining (120) parameter values including the usable memory capacity, usable file storage capacity, usable number of browser windows, and presentation features for each class of hand held electronic device, and storing (130) said parameter values in said database 4. See FIG. 7. In order to accommodate handheld devices for which display capabilities do not encompass the design requirements of the present method and apparatus, the determination of parameter values includes the construction of a window map 5. Some handheld devices cannot display as many windows as are used in the basic ELM/KTT design. The window map reassigns each class of displayable unit of the ELM/KTT from the window for such a class of unit in the basic definition of the ELM/KTT display design to a window for the same class of unit in a display design limited to fewer windows. To build a window map for a specific display class, the present method classifies (121) units of said complex electronic literary or instructional work into display classes for display in a browser window assigned to each said display class, assigns (122) a browser window to each said display class, creates (123) a window map 5 condensing the basic number of display classes into a smaller number of display classes, and includes (124) said window map 5 in said presentation features for each said class of handheld device. In this manner, different classes of displayable units are displayed in the same browser window.

Figure 8:
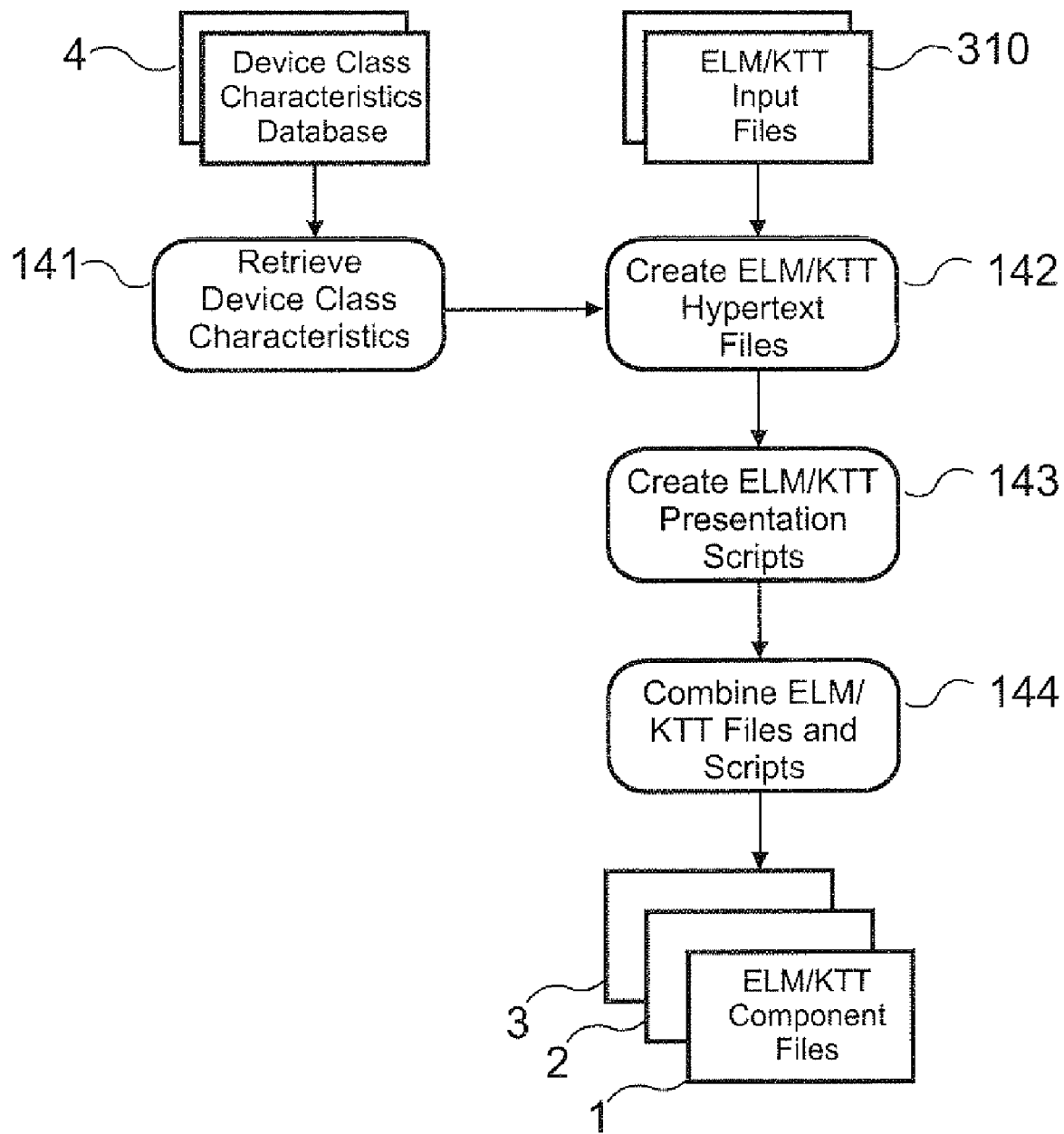
FIG. 8 shows the compilation process of the present method for the ELM/KTT.

See FIG. 8. To compile the ELM/KTT for storage, retrieval, and presentation on each of said classes of handheld electronic devices, the present method retrieves (141) device configuration characteristics from database 4 for each class of handheld electronic device, creates (142) hypertext files of the electronic literary or instructional work (310) based on device configuration characteristics in database 4, including window map 5 (see FIG. 7) for each class of handheld electronic device, creates (143) presentation scripts of the electronic literary or instructional work based on device configuration characteristics in said database for each class of handheld electronic device, and combines (144) said hypertext files and presentation scripts to form a complete, consistent set of ELM/KTT component files 1, 2, 3 for each class of handheld electronic device.

Figure 9:
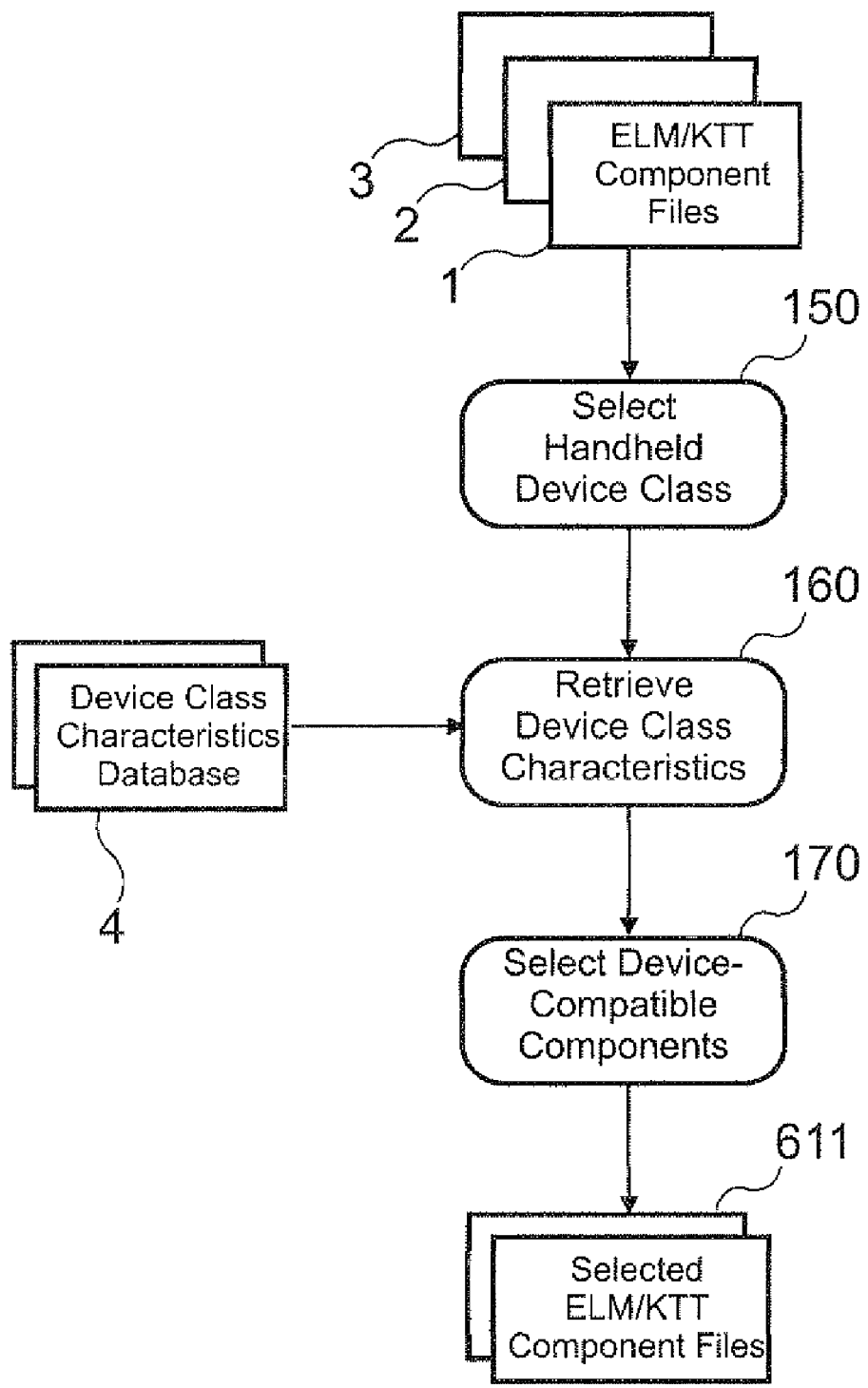
FIG. 9 shows the process of the present method for selecting components targeted for a specific class of handheld device.

See FIG. 9. To select one set of components for a handheld electronic device, the present method selects (150) the class of the handheld devices, uses the device class to retrieve (160) the device configuration characteristics of the handheld electronic device, and selects (170) from all the sets of compiled component files 1, 2, 3 a complete set of components 611 compatible with the device configuration characteristics of the selected class of handheld electronic devices.

To display units from the set of components 611 on the handheld electronic device, the present method directs a unit requested by a reader to the window specified by the display class of the original ELM/KTT and the window map for the handheld device and the display class.

The user of the handheld device accommodates the window placements of the handheld device by the use of standard browser controls (e.g., forward and back buttons) to navigate among displays. The basic design of the ELM/KTT uses three windows. Advanced embodiments use additional windows as required. The basic design interprets link selection for certain types of links in a first window by displaying the linked-to unit in a second window. To navigate from the first ELM/KTT window to the second window in the basic design, the user of the handheld device selects the second window by triggering conventional mouseover and mousedown commands as implemented for the handheld device. But if the window map for the handheld device combines the first and second ELM/KTT windows, the basic design navigation process changes, since there is no way to select the second window immediately. To display the second window in a combined-window case, the present method simply overwrites the first window with the new (second-window) contents. The user returns to the first-window contents by using the browser back button.

The result is an unexpected and convenient presentation of complex and innovative forms of electronic literature such as the ELM/KTT to the user of a handheld electronic computer As described in the incorporated reference, the ELM/KTT can enrich and represent fiction, nonfiction, textbooks, and any other form of written work, including images, animations, video clips, audio tracks, and special symbols and notations. Furthermore, through the use of the wireless Internet connection, the ELM/KTT can interact with components stored on a remote server, allowing the reader to experience the ELM/KTT in a broader and richer context. All this comes with no price to pay in physical weight or bulk. The reader carries a gigabit of electronic literature—over 100 volumes—as easily as the device itself can be carried.

In summary, the present method and apparatus thrust electronic literature into the hands of millions of readers at low cost, with no physical burden, and a wealth of features and functions available only in the framework of electronic media. These readers have already purchased an electronic computing device, expecting only to be entertained by the games and films it presents or the conventional works it contains, but the present method and apparatus offer them a gateway to a whole new world of literature, knowledge, and learning.

The invention claimed is:

1. A method for presenting a complex electronic literary or instructional work on a specific class of handheld electronic device, comprising the steps of:
   compiling a database of device configuration characteristics for each class of said handheld electronic device to be used for presentation of said complex electronic literary or instructional work;
   compiling said electronic literary or instructional work into at least one set of components suitable for storage, retrieval, and presentation on each of said classes of handheld electronic devices;
   retrieving device configuration characteristics of a specific class of handheld electronic devices
   installing at least one set of compiled components compatible with the device configuration characteristics on said handheld electronic device; and
   displaying at least one set of installed components on said handheld electronic device.

2. The method of claim 1 wherein the step of compiling a database of configuration characteristics for each class of handheld electronic device to be used for presentation of said complex electronic literary or instructional work further comprises the steps of:
   determining the usable memory capacity, usable file storage capacity, usable number of browser windows, and presentation features for said each class of handheld electronic devices; and
   storing said usable memory capacity, usable file storage capacity, usable number of browser windows, and presentation features of said each class of handheld electronic devices in said database of device configuration characteristics.

3. The method of claim 2 wherein the step of determining the usable memory capacity, usable file storage capacity, usable number of browser windows, and presentation features for said each class of handheld electronic devices further comprises the steps of:
   classifying units of said complex electronic literary or instructional work into display classes for display in a browser window assigned to each said display class;
   assigning one said browser window to each said display class;
   creating a window map condensing a larger plurality of display classes into a smaller plurality of display classes for each said class of handheld device, thereby requiring different classes of said units to be displayed in the same browser window; and
   including said window map in said presentation features for each said class of handheld device.

4. The method of claim 1 wherein the step of compiling said electronic literary or instructional work into one or more forms suitable for storage, retrieval, and presentation on each of said classes of handheld electronic devices further comprises the steps of:
   retrieving device configuration characteristics from said database for each class of handheld electronic device to be targeted;
   creating hypertext files of the electronic literary or instructional work based on device configuration characteristics in said database for each class of handheld electronic device;
   creating presentation scripts of the electronic literary or instructional work based on device configuration characteristics in said database for each class of handheld electronic device; and
   combining said hypertext files and presentation scripts to form a complete, consistent electronic literary or instructional work for each class of handheld electronic device.

5. The method of claim 1, wherein the step of displaying at least one set of installed components further comprises the steps of:
   directing units of said compiled electronic literary or instructional work to a browser window specified by a display class and a window map for said display class; and
   recovering and displaying contents of said browser window specified by said window map by the use of standard browser controls.

6. A system for presenting a complex electronic literary or instructional work on a handheld electronic device, comprising:
   at least one publishing computer systems comprising one or more processors (CPUs), a user display interface component, one or more user input interface components, one or more memory components, and one or more external communications components;
   at least one handheld electronic devices comprising one or more processors (CPUs), a user display interface component, one or more user input interface components, one or more memory components, and one or more external communications components;
   a configuration database component of a plurality of classes of handheld device configuration characteristics stored on each publishing computer system;
   a window map database component of each said class of handheld device configuration characteristics;
   a plurality of electronic literary or instructional input files for said electronic literary or instructional work stored on each publishing computer system;
   a plurality of presentation component files for said electronic literary or instructional work stored on said plurality of publishing computer systems;
   a plurality of publishing software applications; and
   a plurality of presentation software applications stored on each handheld electronic device.

7. The system of claim 6, wherein the plurality of publishing software applications further comprises:
   a first database software application operating on each publishing computer system for storing said handheld device configuration characteristics in said configuration database component;
   a second database software application operating each publishing computer system for retrieving at least one plurality of class of said handheld device configuration characteristics from said configuration database component;
   a first software application for compiling configuration characteristics for each class of said handheld electronic device to be used for presentation of said complex electronic literary or instructional work for storage in said configuration database component;
   a second software application for compiling said electronic literary or instructional input files into one or more sets of presentation component files suitable for storage, retrieval, and presentation on each class of handheld electronic devices;
   a third software application for selecting one set of said sets of presentation component files; and
   a fourth software application for installing said selected set of presentation component files on each handheld electronic device.

8. The system of claim 7 wherein said first software application further comprises:
- a fifth software application for determining the usable memory capacity, usable file storage capacity, usable number of browser windows, and presentation features for said each class of handheld electronic devices; and
- a sixth software application for storing said usable memory capacity, usable file storage capacity, usable number of browser windows, and presentation features of said each class of handheld electronic devices in said configuration database component.

9. The system of claim 8 wherein said fifth software application further comprises:
- a seventh software application for classifying units of said complex electronic literary or instructional work into display classes for display in a browser window assigned to each said display class, and assigning one said browser window to each said display class; and
- an eighth software application for creating a window map condensing a larger plurality of display classes into a smaller plurality of display classes for each said class of handheld device and including said window map in said presentation features for each said class of handheld device.

10. The system of claim 7 wherein said second software application further comprises:
- a ninth software application for retrieving device configuration characteristics from said configuration database component for each class of handheld electronic device to be targeted;
- a tenth software application for processing electronic literary or instructional input files into presentation component files of the electronic literary or instructional work;
- an eleventh software application for creating presentation scripts of the electronic literary or instructional work; and
- a twelfth software application for combining said presentation component files and presentation scripts to produce a complete, consistent electronic literary or instructional work for each class of handheld electronic device.

11. The apparatus system of claim 7 wherein said third software application further comprises:
- a thirteenth software application for selecting one of said classes of handheld electronic devices;
- a fourteenth software application for retrieving said device configuration characteristics of said specific class of handheld electronic devices from said configuration database component; and
- a fifteenth software application for selecting, from said one or more sets of presentation components, one of said sets of presentation components of said compiled electronic literary or instructional work compatible with the device configuration characteristics of said selected class of handheld electronic devices.

12. The system of claim 7, wherein said fourth software application further comprises:
- a server software application operating on said at least one publishing computer system for sending said set of presentation component files to at least one handheld electronic device in the selected configuration class via one or more of the external communications components;
- a client software application operating on each handheld electronic device in a specific configuration class for receiving and storing said set of presentation component files from the publishing computer system.

13. The system of claim 6, wherein the plurality of presentation software applications stored on each handheld electronic device further comprises a browser software application for displaying each of said set of selected presentation components on each handheld electronic device.

14. The system of claim 13, wherein said browser software application further comprises:
- a browser software application operating on each handheld electronic device of a specific configuration class;
- one or more script interpretation software applications operating on each handheld electronic device of a specific configuration class for interpreting program scripts for said browser software application.

15. A system for facilitating the presentation of an electronic literary or instructional work, comprising:
- at least one publishing computer system comprising at least one processor, a user display interface component, at least one user input interface component, at least one memory component, and at least one external communications component; and
- wherein the at least one memory component is configured to store:
  - a configuration database including at least one class of handheld device configuration characteristics;
  - at least one electronic literary or instructional input file for an electronic literary or instructional work; and
  - at least one presentation file for an electronic literary or instructional work.

16. The system of claim 15 wherein the at least one memory component is further configured to store:
- program instructions that, when implemented by the at least one processor, are configured to:
  - retrieve at least one class of handheld device configuration characteristics from said configuration database;
  - compile configuration characteristics for at least one retrieved class of handheld device configuration characteristics to be used for presentation of an electronic literary or instructional work;
  - compile said at least one electronic literary or instructional input file to produce at least one set of presentation component files; and
  - install the at least one set of presentation component files on a handheld electronic device.

17. The system of claim 15 wherein the at least one memory component is further configured to store program instruction that, when implemented by the at least one processor, are configured to classify units of an electronic literary or instructional work into display classes for display in a browser window and to assign a browser window to each said display class.

18. The system of claim 17 wherein the at least one memory component is further configured to store a window map database and wherein the at least one memory component is further configured to store program instruction that, when implemented by the at least one processor, are configured to create a window map condensing a larger plurality of display classes into a smaller plurality of display classes for at least one class of handheld device.

19. The system of claim 15 wherein the at least one memory component is further configured to store program instruction that, when implemented by the at least one processor, are configured send said at least one presentation file to at least one handheld electronic device via the at least one external communications component.

* * * * *